(12) United States Patent
Goodsitt et al.

(10) Patent No.: US 12,197,623 B2
(45) Date of Patent: *Jan. 14, 2025

(54) SECURING USER-ENTERED TEXT IN-TRANSIT

(71) Applicant: Capital One Services, LLC, McLean, VA (US)

(72) Inventors: Jeremy Goodsitt, Champaign, IL (US); Austin Walters, Savoy, IL (US); Galen Rafferty, Mahomet, IL (US)

(73) Assignee: Capital One Services, LLC, McLean, VA (US)

( * ) Notice: Subject to any disclaimer, the term of this patent is extended or adjusted under 35 U.S.C. 154(b) by 224 days.

This patent is subject to a terminal disclaimer.

(21) Appl. No.: 18/062,859

(22) Filed: Dec. 7, 2022

(65) Prior Publication Data

US 2023/0106584 A1   Apr. 6, 2023

Related U.S. Application Data

(63) Continuation of application No. 16/940,511, filed on Jul. 28, 2020, now Pat. No. 11,550,957, which is a
(Continued)

(51) Int. Cl.
    *G06F 21/62*    (2013.01)
    *G06F 21/60*    (2013.01)
    (Continued)

(52) U.S. Cl.
    CPC ........ *G06F 21/6263* (2013.01); *G06F 21/602* (2013.01); *G06N 3/045* (2023.01); *G06V 30/413* (2022.01); *G06V 40/376* (2022.01)

(58) Field of Classification Search
    None
    See application file for complete search history.

(56) References Cited

U.S. PATENT DOCUMENTS 6,964,013 B1   11/2005   Ono et al.
9,547,821 B1   1/2017    Loreggia et al.
(Continued)

FOREIGN PATENT DOCUMENTS

WO   2017222125 A1   12/2017

OTHER PUBLICATIONS

Jun. 5, 2016, Generative Adversarial Text to Image Synthesis, Scott Reed, Zeynep Akata, Xinchen Yan, Lajanugen Logeswaran, Bernt Schiele, Honglak Lee, University of Michigan, Max Planck Institute for Informatics, Saarbucken, Germany, pp. 1-10.
(Continued)

*Primary Examiner* — Benjamin E Lanier
(74) *Attorney, Agent, or Firm* — Banner & Witcoff, Ltd.

(57) ABSTRACT

Systems and methods described herein discuss securing user-entered data in-transit between a first device and a second device. A user may enter text in a document. A first device may analyze the document to identify the user-entered text. The user-entered text may be separated from the document and transformed into an image using a machine learning algorithm. Transforming the text into an image may secure the data in-transit from the first device to a second device. The second device may receive the image and the document from the first device. The second device may reconstruct the user-entered text from the received image and re-assemble the document from the received document and the reconstructed user-entered text.

20 Claims, 8 Drawing Sheets

Related U.S. Application Data continuation of application No. 16/684,671, filed on Nov. 15, 2019, now Pat. No. 10,733,325.

(51) Int. Cl.
  *G06N 3/045* (2023.01)
  *G06V 30/413* (2022.01)
  *G06V 40/30* (2022.01)

(56) References Cited

U.S. PATENT DOCUMENTS

| | | |
|---|---|---|
| 10,121,104 B1 | 11/2018 | Hu |
| 10,373,023 B1 | 8/2019 | Kim et al. |
| 10,733,325 B1 | 8/2020 | Goodsitt et al. |
| 11,550,957 B2 * | 1/2023 | Goodsitt ............. G06F 21/6263 |
| 2003/0012374 A1 | 1/2003 | Wu et al. |
| 2004/0080772 A1 | 4/2004 | Snyders |
| 2007/0299684 A1 | 12/2007 | Goodwin |
| 2009/0076960 A2 | 3/2009 | Hamel et al. |
| 2010/0014668 A1 | 1/2010 | Yoshioka et al. |
| 2011/0179289 A1 | 7/2011 | Guenther |
| 2011/0185184 A1 | 7/2011 | Guenther |
| 2011/0231666 A1 | 9/2011 | Guenther |
| 2015/0221114 A1 | 8/2015 | Ono |
| 2017/0317983 A1 | 11/2017 | Kompalli |
| 2018/0176409 A1 | 6/2018 | Smith et al. |
| 2018/0247108 A1 | 8/2018 | Hong et al. |
| 2019/0065822 A1 | 2/2019 | Hong et al. |
| 2019/0147336 A1 | 5/2019 | Yu et al. |
| 2019/0272420 A1 | 9/2019 | Gupta et al. |
| 2019/0340419 A1 | 11/2019 | Milman et al. |
| 2020/0035350 A1 | 1/2020 | Sullivan et al. |
| 2020/0082153 A1 | 3/2020 | Holden et al. |

OTHER PUBLICATIONS

Jun. 21, 2019, Font Style Transfer Using Neural Style Transfer and Unsupervised Cross-domain Transfer, Atsushi Narusawa, Wataru Shimoda, and Keiji Yanai, Department of Informatics, The University of Electro-Communications, Tokyo 1-5-1 Chofugaoka, Chofu-Shi, Tokyo 182-8585 Japan (narusawa-a, shimoda-k, yanai). pp. 1-10.

Nov. 15, 2018, Unpaired Image-to-Image Translation using Cycle-Consistent Adversarial Networks, Jun-Yan Zhu, Taesung Park, Phillip Isola, Alexei A. Efros, Berkeley AI Research (BAIR) Laboratory, UC Berkeley, pp. 1-18.

McPherson et al. "Defeating Image Obfuscation with Deep Learning." In: Cornell University Library/ Computer Science/ Cryptography and Security, Sep. 1, 2016, [online] [retrieved on Jan. 9, 2021 (Jan. 9, 2020)] Retrieved from the Internet <URL: https://arxiv.org/abs/1609.00408 >, entire document.

Chang et al. "Generating Handwritten Chinese Characters using CycleGAN." In: Cornell University Library/Computer Vision and Pattern Recognition/ Cryptography and Security, Jan. 25, 2018, [online] [retrieved on Jan. 9, 2021 (Jan. 9, 2020)] Retrieved from the Internet< URL:https://arxiv.org/abs/1801.08624 >, entire document.

Jan. 29, 2021—International Search Report and Written Opinion—PCT/US2020/060334.

* cited by examiner

FIG. 4

LOAN APPLICATION FORM

Personal Information     Ref. No.: _____ (for internal use)

412 — Name: Lee M. Cardholder    SSN: XXX-XX-XXXX — 414

416 — DOB: Feb. 14, 1990

418
- Street: 123 Main St.    Apt. No.: 3C
- City: Anytown
- State: VA    Zip Code: 22314
- Country: USA Is this your current Address? (Y) or N
From: June 2013    To: Present Mobile: 703-555-1234
Home: 571-555-9876

Employment

420
- Employment Status: (Employed) / Self Employed / Retired / Unemployed
- Name of Employer: Acme Ltd.
- Address: 812 Alton Ave
- City: Washington
- State: DC    Zip Code: 20005
- Work Phone: 202-555-3456
- No. of Years Employed: 6.5

Supervisor Name: Bob Smith
Work Phone: 202-555-3210

Income
Salary: $125,000
Additional Yearly Income (if applicable): N/A

422 — Signature: *Lee M. Cardholder*    Date: Jan. 1, 2020
Name: Lee M. Cardholder

410

SECURING USER-ENTERED TEXT IN-TRANSIT

CROSS REFERENCE TO RELATED APPLICATIONS

This application is a continuation of co-pending application U.S. application Ser. No. 16/940,511, filed on Jul. 28, 2020 and entitled "Securing User-Entered Text In-Transit," which is a continuation of U.S. application Ser. No. 16/684,671 (now U.S. Pat. No. 10,733,325), filed on Nov. 15, 2019 and entitled "Securing User-Entered Text In-Transit," the entireties of which are hereby incorporated in their entireties by reference.

FIELD OF USE

Aspects of the disclosure relate generally to encryption and more specifically to transforming user-entered text to secure the user-entered text in-transit.

BACKGROUND

Users enter personally identifiable information (PII) on documents all the time. For example, as part of a loan or credit application or at a doctor's office filling out medical forms. Oftentimes, the PII is handwritten. The document, including all the user's PII, may be scanned and transmitted to a central location, such as a head office or an electronic medical records (EMR) service, for additional processing and/or storage. However, a malicious user may gain access to the document, and the sensitive information contained therein, while being transmitted between a first device and a second device. Accordingly, existing security measures of protecting data in-transit may fall short, thereby exposing a user's PII to a malicious user.

Aspects described herein may address these and other problems, and generally improve the security, efficiency, and speed of user-entered text in-transit.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems and methods described herein discuss securing user-entered data in-transit between a first device and a second device. A user may enter sensitive data, such as personally identifiable information (PII) and/or handwritten signatures, in a document. A first device may analyze the document to identify the user-entered text. The user-entered text may be separated from the document and transformed into an image using a machine learning algorithm. Transforming the text into an image may secure the data in-transit from the first device to a second device. The second device may receive the image and the document from the first device. The second device may reconstruct the user-entered text from the received image and re-assemble the document from the received document and the reconstructed user-entered text.

These features, along with many others, are discussed in greater detail below.

BRIEF DESCRIPTION OF THE DRAWINGS

The present disclosure is described by way of example and not limited in the accompanying figures in which like reference numerals indicate similar elements and in which:

FIG. 4 shows an example of a document that contains user-entered text according to one or more aspects of the disclosure;

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for transforming user-entered text (e.g., handwritten user data or handwritten signatures) into images to secure the data in-transit between a first device and a second device.

Systems and methods described herein discuss securing user-entered data in-transit between a first device and a second device. A user may enter sensitive data, such as personally identifiable information (PII) and/or handwritten signatures, in a document. A first device may analyze the document to identify the user-entered text. The user-entered text may be separated from the document and transformed into an image using a machine learning algorithm. Transforming the text into an image may secure the data in-transit from the first device to a second device. The second device may receive the image and the document from the first device. The second device may reconstruct the user-entered text from the received image and re-assemble the document from the received document and the reconstructed user-entered text.

Figure 1:
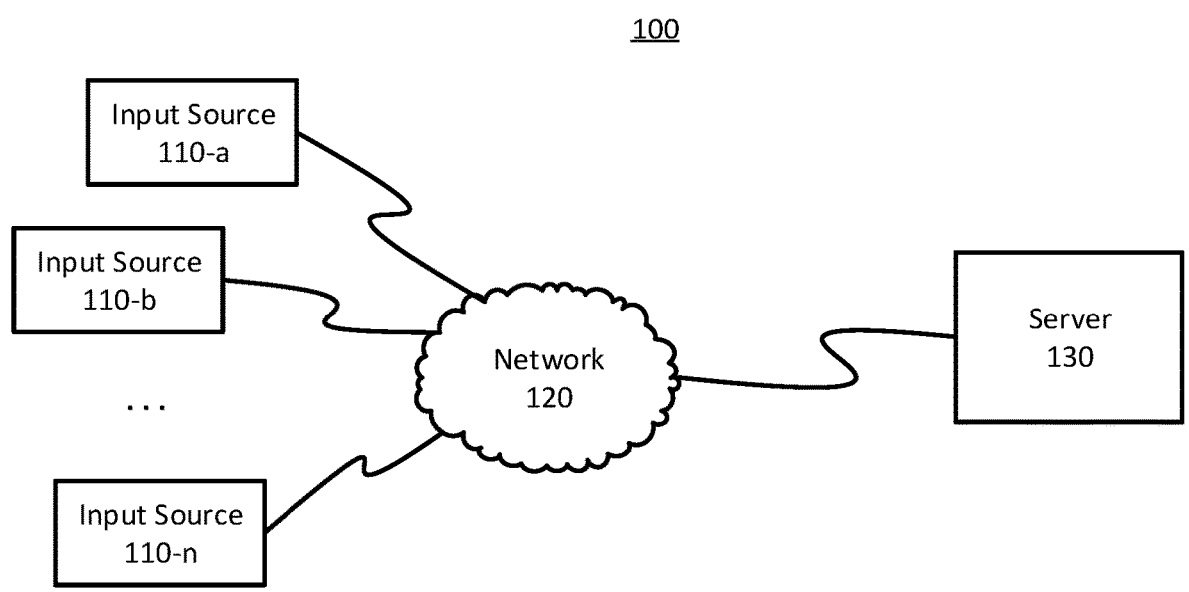
FIG. 1 shows an example of a control processing system in which one or more aspects described herein may be implemented.

FIG. 1 shows a system 100 according to one aspect of the disclosure. The system 100 may include a plurality of input sources 110 (i.e., 110-*a*, 110-*b*, . . . 110-*n*) connected to first server 130 via first network 120.

Input sources 110 may be any device capable of obtaining a document that contains user-entered text. In this regard, input sources may include scanner, a camera, camera-arrays, camera-enabled mobile-devices, etc. Alternatively, input sources may include computing devices, such as laptop computers, desktop computers, mobile devices, smart phones, tablets, and the like. According to some examples, input sources may include hardware and software that allow them to connect directly to first network 120. Alternatively, input sources 110 may connect to a local device, such as a personal computer, server, or other computing device, which connects to first network 120. In some embodiments, input source 110 may include a scanner associated with an automated teller machine (ATM). The scanner may be configured to scan checks, certificates of deposit, money orders, and/or currency. In other embodiments, the input source 110 may be a scanner located at a branch location. The scanner may be configured to scan documents, such as loan and/or credit applications, and securely transmit the documents to a central location, such as a head office or a central banking location, for further processing.

First network 120 may include any type of network. First network 140 may include a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

First server 130 may be any server capable of processing the document obtained by input sources 110 using the techniques described herein. In this regard, first server 130 may be a stand-alone server, a corporate server, or a server located in a server farm or cloud-computer environment. According to some examples, first server 130 may be a virtual server hosted on hardware capable of supporting a plurality of virtual servers. As discussed above, the first server 130 may be at a central location, such as a head office or a central banking location. The first server 130 may receive the document from one or more input sources and process the document accordingly.

The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
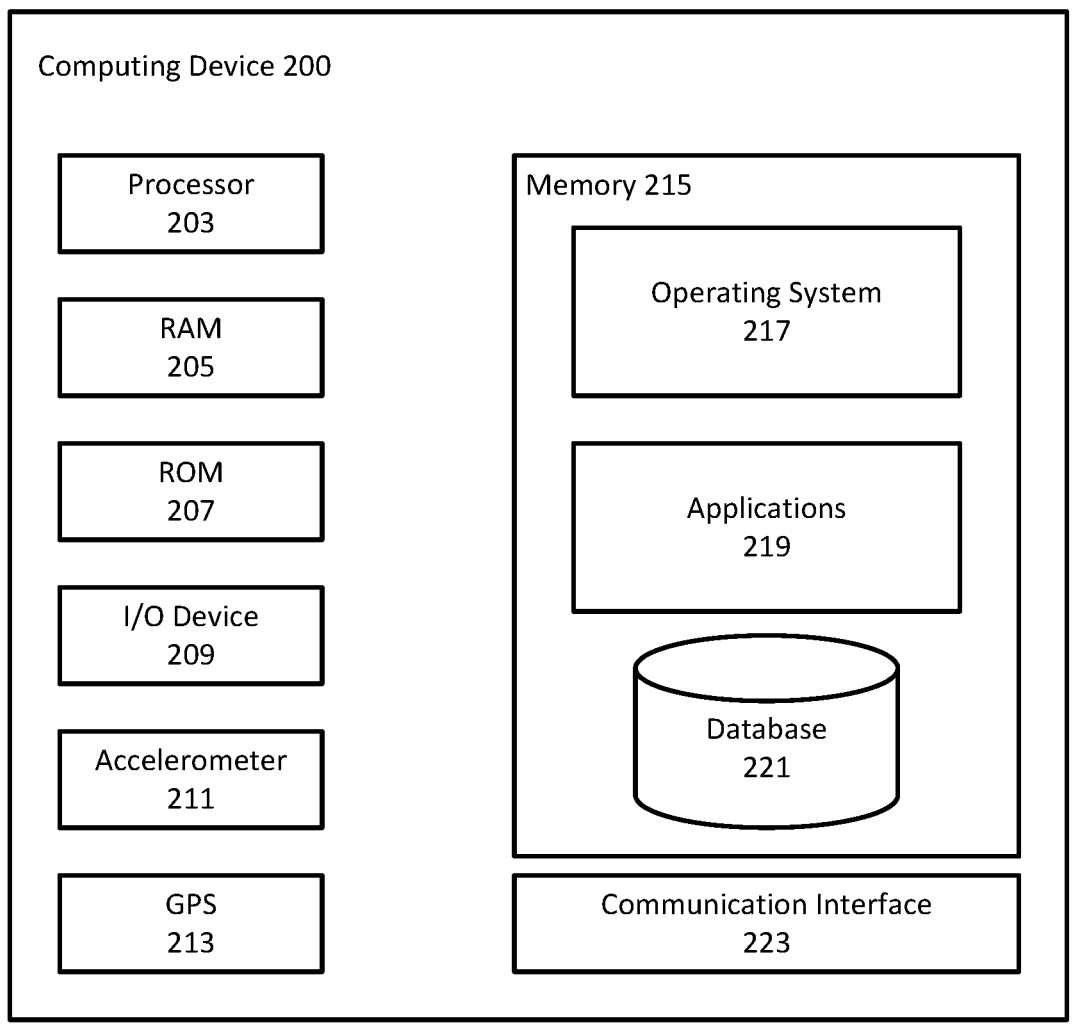
FIG. 2 shows an example computing device in accordance with one or more aspects described herein.

Any of the devices and systems described herein may be implemented, in whole or in part, using one or more computing systems described with respect to FIG. 2. Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, accelerometer 211, global-position system antenna 213, memory 215, and/or communication interface 223. A data bus may interconnect processor(s) 203, RAM 205, ROM 207, memory 215, I/O device 209, accelerometer 211, global-position system receiver/antenna 213, memory 215, and/or communication interface 223. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. In some embodiments, I/O device 209 may include an image capture device, such as a camera. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Accelerometer 211 may be a sensor configured to measure accelerating forces of computing device 200. Accelerometer 211 may be an electromechanical device. Accelerometer may be used to measure the tilting motion and/or orientation computing device 200, movement of computing device 200, and/or vibrations of computing device 200. The acceleration forces may be transmitted to the processor to process the acceleration forces and determine the state of computing device 200.

GPS receiver/antenna 213 may be configured to receive one or more signals from one or more global positioning satellites to determine a geographic location of computing device 200. The geographic location provided by GPS receiver/antenna 213 may be used for navigation, tracking, and positioning applications. In this regard, the geographic may also include places and routes frequented by the first user. In the context of a locking application, GPS receiver/antenna 213 may be used to locate the computing device 200 to determine whether a current location is a location that satisfies an unlock condition. In some embodiments, GPS receiver/antenna 213 may be used to determine the orientation of a device (e.g., facing north), as part of determining whether an unlock condition is satisfied.

Communication interface 223 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
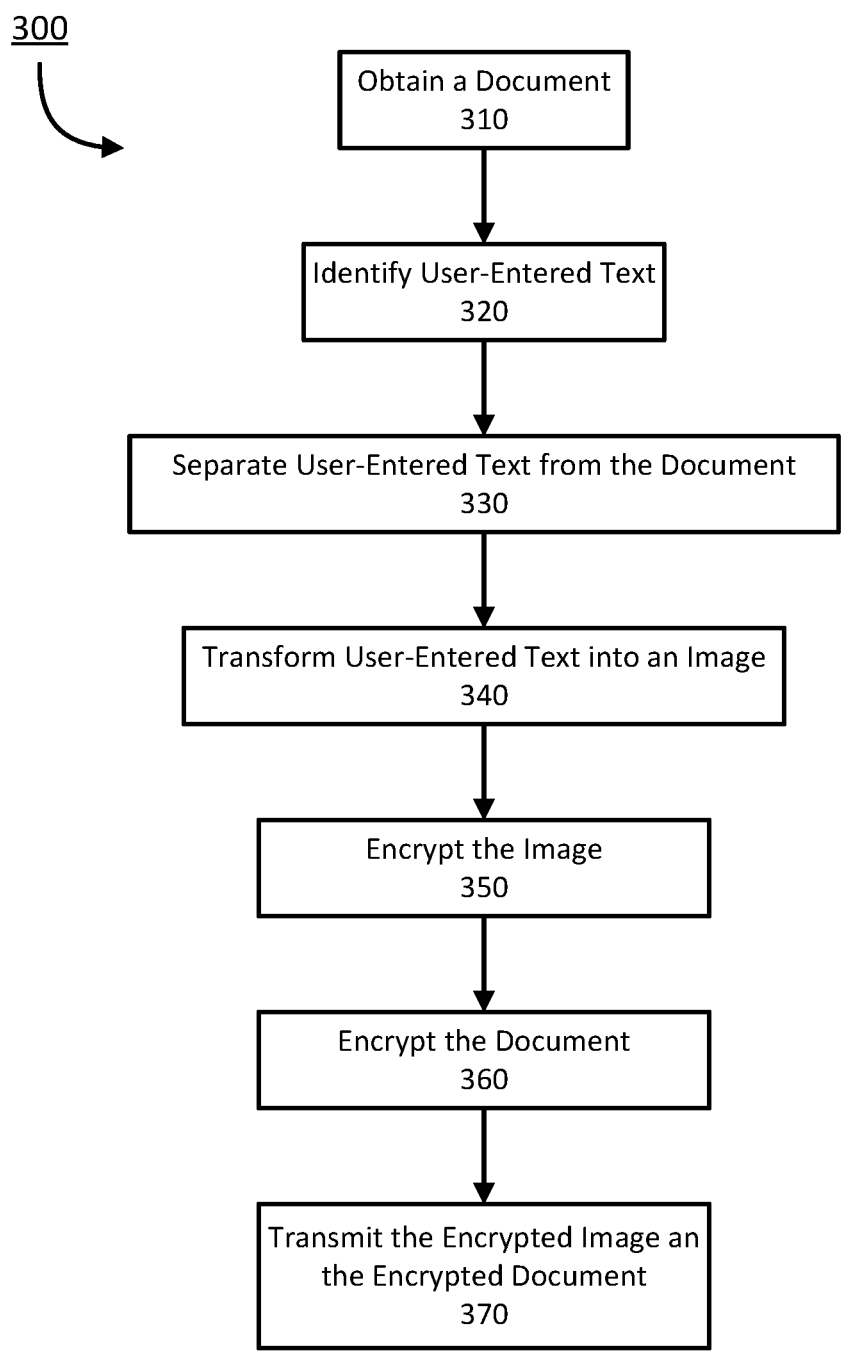
FIG. 3 shows a flow chart of a process for securing user-entered text in-transit according to one or more aspects of the disclosure.

Users enter personal information on documents every day. For example, as part of a loan or credit application or at a doctor's office. Oftentimes, the personal information may be handwritten. The handwritten document may then be scanned and transmitted to a central location, such as a head office or an electronic medical records (EMR) service, for additional processing and/or storage. FIG. 3 shows a flow chart of a process for securing user-entered text in-transit according to one or more aspects of the disclosure. Some or all of the steps of process 300 may be performed using one or more computing devices as described herein.

In step 310, a first device may receive a document. The first device may be a scanner, or another device, configured to capture the document. The document may contain user-entered text. The user-entered text may include personally identifiable information (PII), such as the user's name, address, phone number (e.g., mobile, home, and/or work), email address (e.g., personal and/or professional), social security number, driver's license number, passport number, bank account information, previous address information, employer information, employment history, salary information, earnings information, health and/or medical information, and the like. In some instances, the user-entered text may be handwritten. The user-entered text may also include a handwritten signature of the user filling out the document. Alternatively, the first device may be a computing device from which the user may enter data in fields of the document. In these examples, the user-entered text may be typed into the document. The document may include a digital or electronic signature of the user.

In step 320, the first device may identify the user-entered text in the document. In some embodiments, identifying the user-entered text may be based on an automated analysis of the document. The automated analysis may be configured to scan the document to locate one or more fields of user-entered information. The automated analysis may include object character recognition, image segmentation, background subtraction, or any equivalent thereof to identify the handwritten signature. In addition to identifying handwritten signatures, the automated analysis of the document may identify any modifications and/or alterations made to the document. For example, background subtraction may be used to determine any text, field, location, or other section of a document and/or form that has been modified and/or altered. In this regard, background subtraction may be used to identify the handwritten signature, as well as any other fields of user-entered text (e.g., name, address, social security number, etc.). After identifying one or more fields of user-entered text, the first device may separate the user-entered text from the document in step 330. Separating the user-entered text may include extracting the user-entered text as an image. Alternatively, the user-entered text may be extracted from the document as text, or character strings. In some embodiments, the first device may tag, or otherwise identify, both the user-entered text and the location in the document from which the user-entered text was taken. As will be discussed in greater detail below, these tags may be used by the second device to reconstruct a complete document from the transformed user-entered text and the transmitted document.

In step 340, the first device may transform the user-entered text. Transforming the user-entered text may include transforming an image of the first user-entered text into a second image. In preferred embodiments, the first device may use a machine learning algorithm to perform the transformation. The machine learning algorithm may be a neural network, such as a generative adversarial network (GAN) or a consistent adversarial network (CAN), such as a cyclic generative adversarial network (C-GAN), a deep convolutional GAN (DC-GAN), GAN interpolation (GAN-INT), GAN-CLS, a cyclic-CAN (e.g., C-CAN), or any equivalent thereof. The neural network may be trained using supervised learning, unsupervised learning, back propagation, transfer learning, stochastic gradient descent, learning rate decay, dropout, max pooling, batch normalization, long short-term memory, skip-gram, or any equivalent deep learning technique.

The transformation may be an image-to-image transform. That is, the first image (e.g. user-entered text) may be transformed into a second image. For example, a handwritten signature may be recognized as a first image. The first image (e.g. of the handwritten signature) may be transformed into a second image (e.g., an image of a dog). Alternatively, the transformation may be a text-to-image transformation or a font transformation. In a text-to-image transformation, the text may be obtained using a text recognition technique, such as object character recognition. The neural network may then transform the text into an image. For example, the text "the flower has pink petals" may be transformed into a picture of a pink rose or a pink tulip. In the context of the examples discussed herein, user-entered text, such as a street address, may be transformed into a street view image of the street address. Alternatively, the street address may be transformed into a rendering (e.g., a line drawing) of the street view image Alternatively, the text-to-image transformation may transform the image without regard for the context of the text. In this regard, the machine learning algorithm may transform the text into a patterned image. For example, a social security number may be transformed in to a speckled pattern. Alternatively, the text may be transformed into an image of an object. For instance, a street address may be transformed into an image of a cat. In another embodiment, the transformation may be a font transformation. The font transformation may transform a first font of the user-entered text into a second font. For example, the user-entered text may be text typed in a common font, such as Times New Roman. A font transformation may convert the Times New Roman font to a second font. The second font may be a font designed to obfuscate the user-entered text, such as Wingdings. Alternatively, the second font may be the same font as the one used in the document to make the user-entered text appear uniform to the text of the document. For instance, handwritten user-entered text may be converted to the font used in the document. In another example, the font transformation may convert handwritten user-entered text into a standard font, such as Times New Roman. By converting handwriting into a standard font, subsequent document processing may be performed more efficiently since the handwriting has already been converted to a legible font.

In step 350, the first device may encrypt the result of the transformation of the user-entered text. In preferred embodiments, the first device may encrypt an image that resulted from the transformation of the user-entered text. The encryption may be based on a symmetric encryption algorithm, such as AES, DES, or the like, and an encryption key that is shared between the first device and a second device. The encryption key may be generated using a key agreement protocol, such as ECDH. Alternatively, the encryption algorithm may use an asymmetric encryption algorithm, such as RSA. In this regard, the first device may obtain a public key associated with the second device. The public key may be obtained from a key distribution center (KDC) or, alternatively, directly from the second device. As will be discussed in greater detail below, the second device may decrypt the encrypted image using a corresponding private key, which only the second device may know. In some embodiments, the transformation of the user-entered text may sufficiently obfuscate the information contained in the user-entered text and the encryption performed in step 350 may be skipped. In step 360, the first device may encrypt the document using the techniques described above. Similar to step 350, step 360 may be skipped in some embodiments.

In step 370, the first device may transmit the encrypted image and the encrypted document to the second device. In preferred embodiments, the encrypted image and the encrypted document may be transmitted as separate communications. Transmitting the image and document separately may provide an additional layer of security. For instance, if the image is intercepted by a malicious user without the document, the image appears to be an image, or an encrypted image, being transmitted between a first device and a second device, which may not warrant further scrutiny from the malicious user. Even if the malicious user were to recognize the image as being transformed information, the malicious user may not have access to the model used to transform the user-entered text into the image. Accordingly, the malicious user will not be able to reconstruct the user-entered text from the image without the model. Therefore, the transformation of user-entered text into an image provides a form of encryption and/or obfuscation that secures the data while the data is in-transit from the first device to the second device.

While the above process discussed above describes transforming a first user-entered text into a first image, it will be appreciated that a plurality of user-entered text may be transformed into a plurality of images. For instance, a social security number may be transmitted into a second image and the user's address may be transformed into a third image. The transformation process may be performed for any of the information provided by the user. Further, each image generated from user-entered text may be transmitted separately from the document for at least the reasons discussed above.

As discussed above, the techniques for obfuscating and/or encrypting user-entered text written on documents may apply to a variety of documents and situations. FIG. 4 shows an example of a document that contains user-entered text according to one aspect of the disclosure.

FIG. 4 illustrates document 410. Document 410 may be a loan application. As discussed above, document 410 may be a medical form, a credit application, a job application, or the like. In some embodiments, document 410 may be a physical document that the user fills out. Alternatively, document 410 may be a digital document, such as a portable document format (PDF), that the user fills out using a computing device. Document 410 may include the user's name 412, social security number 414, date of birth 416, and address information 418. Additionally, document 410 may include employment history 420 and signature 422. In some embodiments, signature 422 may be a handwritten signature. Alternatively, signature 422 may be a digital signature. Document 410 may include a variety of sensitive user data and PII depending on the purpose of document 410. For example, document 410 may include address history for a number of years (e.g., 10 years). Further, document 410 may include previous employment history. In additional embodiments, document 410 may request more financial information from the user. It will be appreciated that document 410 is merely illustrative and may include additional, or less, information that which is illustrated in FIG. 4 and discussed above.

As discussed above, a first device may scan a document, such as document 410, and identify one or more fields of user data (e.g., user-entered text). The user data may be transformed using the techniques described above. FIGS.

5A-5C illustrate examples of transforming user-entered text into an image according to one or more aspects of the disclosure.

Figure 5A:
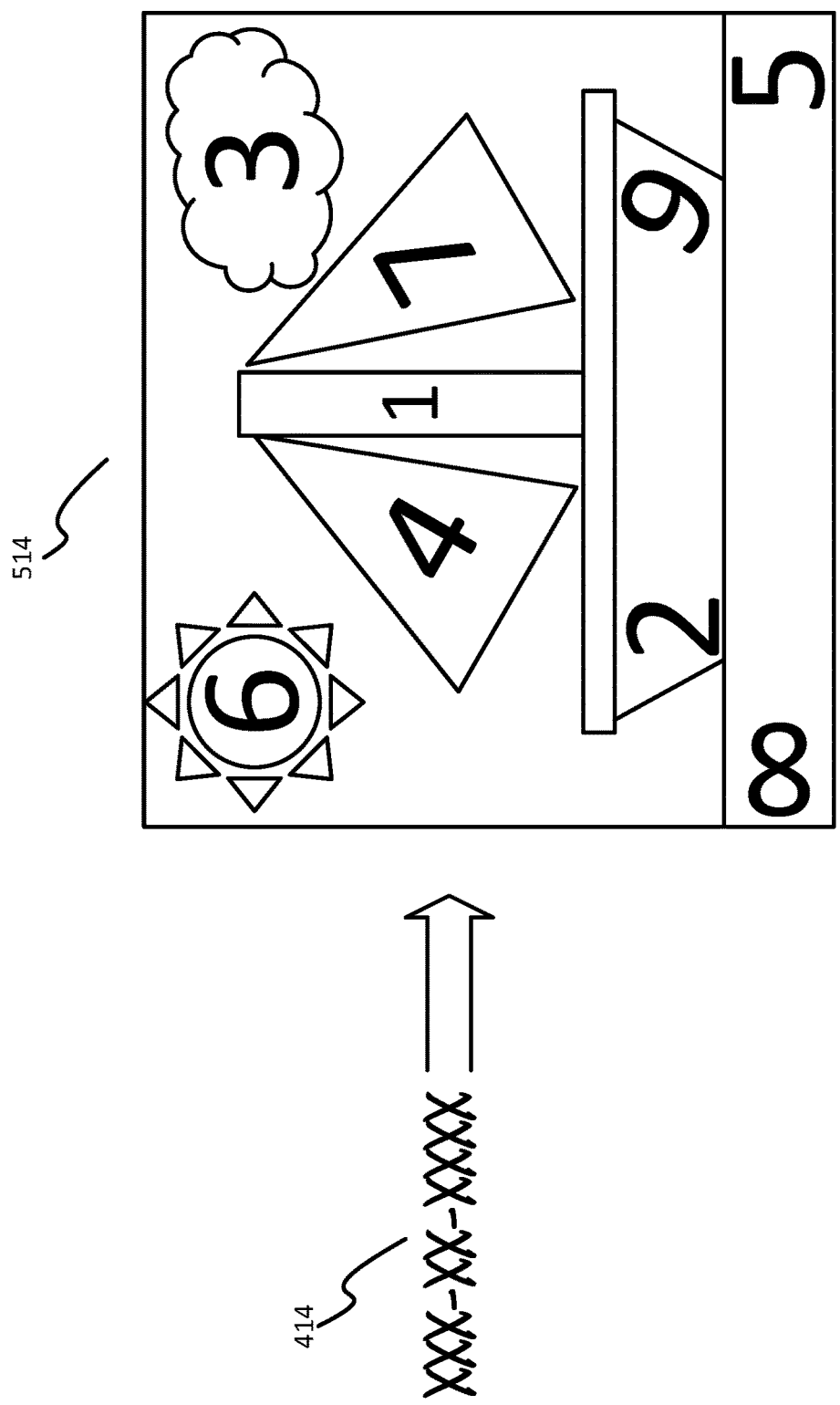
FIGS. 5A-5C show examples of transforming user-entered text into an image according to one or more aspects of the disclosure.

FIG. 5A illustrates an example social security number 414 being transformed into image 514. Using the techniques described above, social security number 414 may be identified and separated from the document. Separating social security number 414 may include extracting the entirety of social security number 414 from the document as an image. Alternatively, social security number 414 may be extracted from the document as text. After extraction, social security number 414 may be analyzed by the machine learning algorithm. In additional to the actual data contained in social security number 414, the machine learning algorithm may evaluate the user's handwriting, the force of the user's handwriting (e.g., by how dark the ink appears), and other characteristics of the handwritten text. Based on the analysis and evaluations of the machine learning algorithm, the machine learning algorithm may generate image 514. As illustrated in FIG. 5A, image 514 may have the numbers that constitute the user's social security number embedded and/or hidden therein. In this context, the numbers may be randomly arranged or re-arranged such that a malicious user would be unable to determine the correct sequence of the user's social security number. Alternatively, image 514 may be an image selected by the machine learning algorithm. In this regard, image 514 may be picture of a street that contains the numbers of the user's social security number. Similarly, image 514 may be a keypad or a number pad. It will be appreciated that the machine learning algorithm may transform social security number 414 into any suitable image.

Figure 5B:
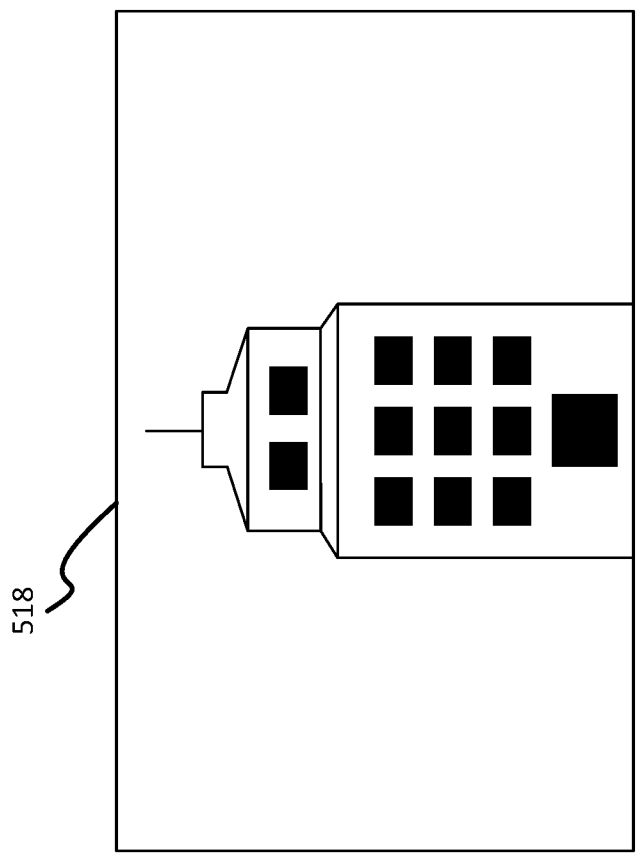

FIG. 5B illustrates an example of street address 418 being transformed into image 518. Street address 418 may be extracted from the document and analyzed by the machine learning algorithm using the techniques described above. Written street address 418 may then be transformed into image 518, which may be the actual street view of the user's address. Alternatively, image 518 may be a rendering, such as a line drawing, of the user's written address. In alternative embodiments, image 518 may be a street view image of a similar address in a different state. For instance, street address 418 may be for 123 Main St. Anytown, Virginia. However, the machine learning algorithm may transform street address 418 into an image for 123 Main St. Anytown, Maryland. It will be appreciated that the foregoing examples are merely illustrative, and the machine learning algorithm may return any suitable image for street address 418.

Figure 5C:
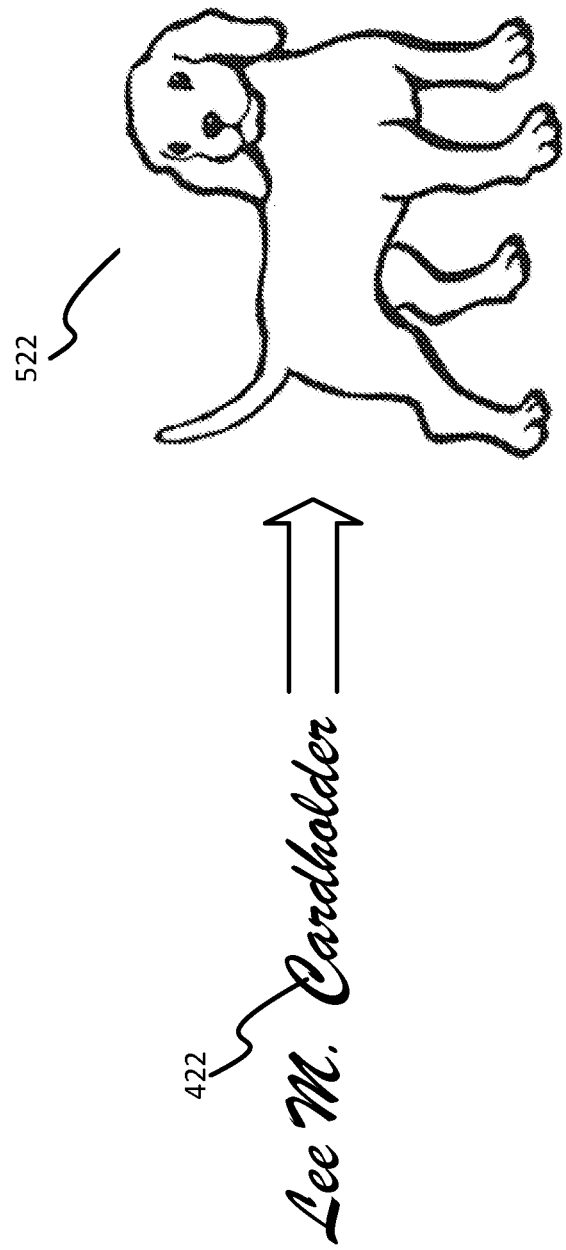

FIG. 5C illustrates an example of handwritten signature 422 being transformed into image 522. As discussed above, handwritten signature 422 may be separated from the document (e.g., as an image or as text) and analyzed by the machine learning algorithms described herein. Handwritten signature 422 may be transformed into image 522, which may be an image of a dog. The machine learning algorithm may analyze the strokes of the user's handwriting, the color and hue of the ink, and a variety of other characteristics associated with the handwritten signature 422. Based on the analysis of handwritten signature 422, the machine learning algorithm may transform handwritten signature 422 into image 522. It will be appreciated that the machine learning algorithm may transform handwritten signature 422 into any suitable image using the techniques described above.

Figure 6:
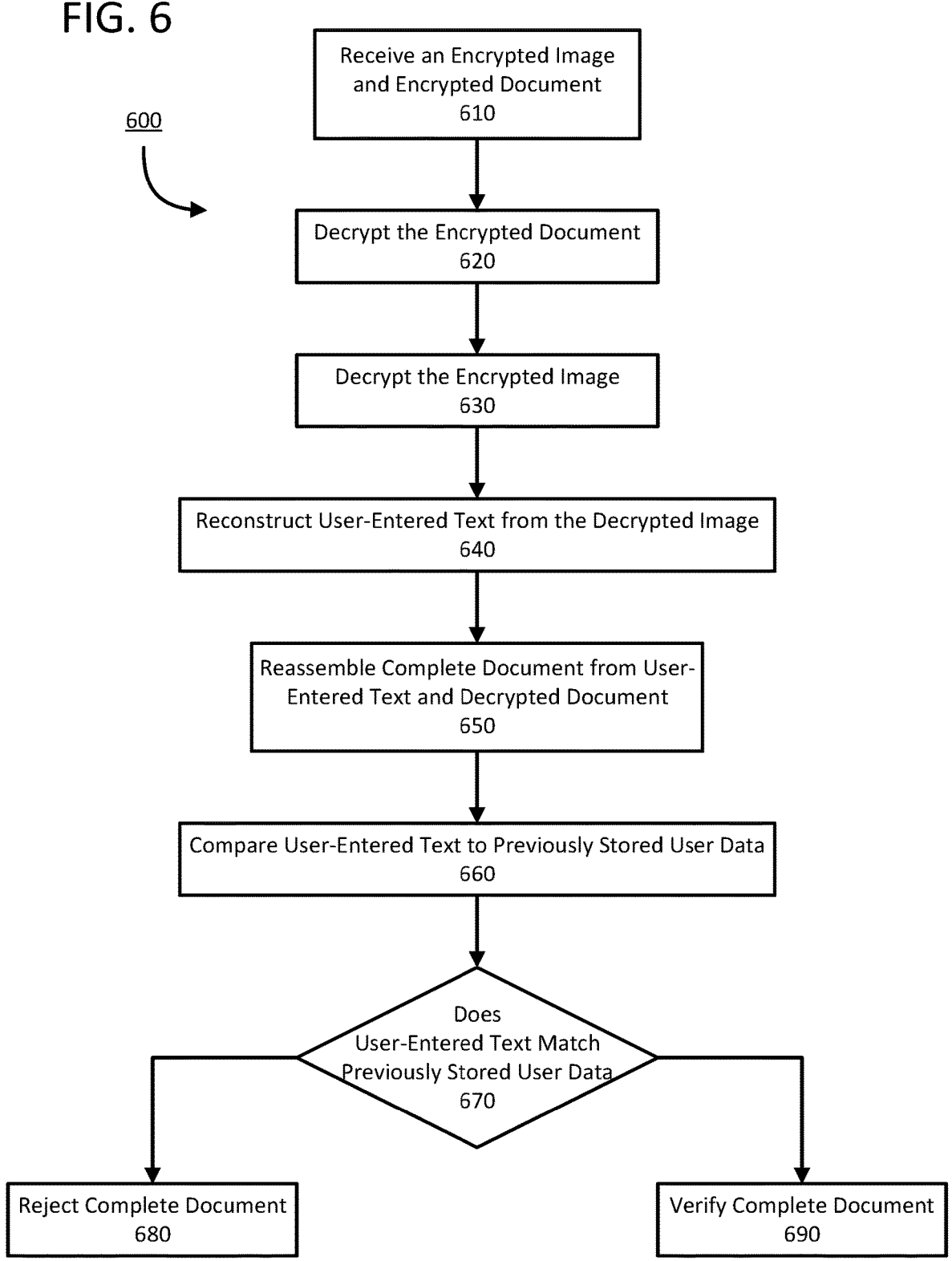
FIG. 6 shows a flow chart of a process for reconstructing the user-entered text from the received image and forming a complete document according to one or more aspects of the disclosure.

After transforming the user-entered text into images, the first device may transmit the images, and the document from which they came, to the second device. Once the second device received the image and the document, the second device may reconstruct the user-entered text and combine the reconstructed user-entered text with the document to form a complete document. FIG. 6 shows a flow chart of a process for reconstructing the user-entered text from the received image and forming a complete document according to one or more aspects of the disclosure. Some or all of the steps of process 600 may be performed using one or more computing devices as described herein.

In step 610, the second device may receive an encrypted image and a document from the first device. As discussed above, the second device may also receive a plurality of encrypted images from the first device. Each of the plurality of encrypted images may correspond to a separate field of user-entered text.

In step 630, the second device may decrypt the encrypted document. As noted above, the encrypted document may be decrypted using any suitable key and encryption algorithm (e.g., a symmetric key and a symmetric encryption algorithm, a private key and an asymmetric encryption algorithm). Similarly, in step 630, the second device may decrypt the encrypted image. As noted above, the second device may decrypt the encrypted image using a symmetric key and a symmetric encryption algorithm. Alternatively, the encrypted image may be decrypted using a private key and an asymmetric encryption algorithm. Step 630 may be repeated for each of the plurality of encrypted images received from the first device. As noted above, the image may not be encrypted using an encryption key. In these embodiments, step 630 may be skipped or omitted.

In step 640, the second device may reconstruct the user-entered text from the decrypted image. Reconstructing the user-entered text from the received image may be the inverse of the transformation process described above with respect to step 340 in FIG. 3. Accordingly, the second device may perform an image-to-image transformation, an image-to-text transformation, a font transformation, and/or an equivalent thereof. Similarly, the second device may use the same neural network to reconstruct the user-entered text from the received image that the first device used to transform the user-entered text into the image. Following the examples discussed above, the second device may reconstruct a handwritten signature of a user of the first device from the decrypted image. Further, the second device may repeat step 640 to reconstruct a plurality of user-entered text from a plurality of received images. For instance, each piece of personally identifiable information (PII) may be transformed (e.g., converted) into a different image. The second device may reconstruct each piece of PII from each of the different images.

In step 650, the second device may create a complete document by reassembling the reconstructed user-entered text and the received document. As discussed above, each of the plurality of user-entered text may be tagged with an identifier that indicates the field with which the user-entered text corresponds to. The document may be similarly tagged. The second device may use the tags contained within the document and the reconstructed user-entered text to form the completed document. For example, the user's handwritten name may appear on the name line, their handwritten social security number may appear on the social security number line, and their handwritten signature may appear on the signature line.

In step 660, the second device may compare whether the user-entered text to previously stored user data. In step 670, the second device may determine whether the user-entered text matches previously stored user data. In some embodiments, the second device may determine whether the reconstructed handwritten signature matches a previously stored signature provided by the user. In alternative embodiments, the second device may determine whether additional user-entered text matches previously stored user information. For example, the second device whether the comparing the reconstructed handwritten signature to a previously registered handwritten signature to determine whether the reconstructed handwritten signature and the previously registered handwritten signature match. The comparison may also be performed on the user's social security number, address, phone number, employer information, or any other information included in the document.

When the user-entered text does not match previously stored user data, the second device may reject the complete document in step 680. In some embodiments, a threshold may be established to account for typographical errors or differences in how the data may be formatted. Accordingly, the threshold may define a permitted number of errors in the document. For example, one error may not be sufficient to reject the document; however, several errors (e.g., >3) may result in the document being rejected.

When the user-entered text matches the previously stored user data, the second device may verify the complete document in step 690. Upon verification the complete document may be further processed. For instance, if the complete document is a check, the check may be cashed. In another example, the complete document may be a loan application, which may begin being processed after being verified by the second device.

The techniques described herein may be used to secure user-entered text, and, in particular sensitive information and handwritten signatures, while in-transit between devices. By transforming the text into images, the data contained in the text may be obfuscated and/or encrypted. Even if the image that resulted from the transformed text were to be intercepted by a malicious user, the image would appear to be an image, or an encrypted image, being transmitted between a first device and a second device, which may not warrant further scrutiny from the malicious user. Furthermore, the malicious user may not be able to reconstruct the text from the image even if the malicious user were to recognize the image as being transformed information because the malicious user would not have access to the machine learning algorithm to reconstruct the text from the intercepted image. Therefore, the transformation of user-entered text into an image provides a form of encryption and/or obfuscation that secures the data while the data is in-transit from the first device to the second device.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
   identifying, based on an automated analysis of a document, two or more fields of user-entered text, wherein the two or more fields of user-entered text comprise personally identifiable information;
   removing a first field of user-entered text, of the two or more fields of user-entered text, from the document;
   removing a second field of user-entered text, of the two or more fields of user-entered text, from the document;
   transforming, using a neural network, the first field of user-entered text into a first image that obfuscates the first field of user-entered text while the document is in-transit to a second computing device;
   generating a first tag associated with the first image, wherein the first tag is used to recreate the document by indicating a first location of the first field of user-entered text in the document;
   transforming, using the neural network, the second field of user-entered text into a second image that obfuscates the second field of user-entered text while the document is in-transit to the second computing device;
   generating a second tag associated with the second image, wherein the second tag is used to recreate the document by indicating a second location of the second field of user-entered text in the document; and
   transmitting, to the second computing device, an electronic communication comprising the document with the two or more fields of user-entered text removed, the first image, the first tag, the second image, and the second tag.

2. The computer-implemented method of claim 1, comprising:
   encrypting, prior to the transmitting the document with the two or more fields of user-entered text removed, the first image, and the second image, the first image using an encryption key and an encryption algorithm; and
   transmitting, to the second computing device, the encrypted first image with the document with the two or more fields of user-entered text removed and the second image.

3. The computer-implemented method of claim 1, further comprising:
identifying, during the automated analysis of the document, the one or more fields of user-entered text using image segmentation.

4. The computer-implemented method of claim 1, further comprising:
identifying, during the automated analysis of the document, comprises background subtraction to identify the one or more fields of user-entered text using background subtraction.

5. The computer-implemented method of claim 1, further comprising:
transforming the first field of user-entered text into the first image using an image-to-image transformation.

6. The computer-implemented method of claim 1, further comprising:
transforming the first field of user-entered text into the first image using a text-to-image transformation.

7. The computer-implemented method of claim 1, further comprising:
transforming the first field of user-entered text into the first image using a font transformation.

8. A first computing device comprising:
one or more processors; and
memory storing instructions that, when executed by the one or more processors, cause the computing device to:
identify, based on an automated analysis of a document, two or more fields of user-entered text, wherein the two or more fields of user-entered text comprise personally identifiable information;
remove a first field of user-entered text, of the two or more fields of user-entered text, from the document;
remove a second field of user-entered text, of the two or more fields of user-entered text, from the document;
transform, using a neural network, the first field of user-entered text into a first image that obfuscates the first field of user-entered text while the document is in-transit to a second computing device;
generate a first tag associated with the first image, wherein the first tag is used to recreate the document by indicating a first location of the first field of user-entered text in the document;
transform, using the neural network, the second field of user-entered text into a second image that obfuscates the second field of user-entered text while the document is in-transit to the second computing device;
generate a second tag associated with the second image, wherein the second tag is used to recreate the document by indicating a second location of the second field of user-entered text in the document; and
transmit, to the second computing device, an electronic communication comprising the document with the two or more fields of user-entered text removed, the first image, first tag, the second image, and the second tag.

9. The first computing device of claim 8, wherein the instructions, when executed by the one or more processors, cause the first computing device to:
encrypt, prior to the transmitting the document with the two or more fields of user-entered text removed, the first image, and the second image, the first image using an encryption key and an encryption algorithm; and
transmitting, to the second computing device, the encrypted first image with the document with the two or more fields of user-entered text removed and the second image.

10. The first computing device of claim 8, wherein the automated analysis of the document comprises at least one of:
image segmentation to identify the one or more fields of user-entered text; or
background subtraction to identify the one or more fields of user-entered text.

11. The first computing device of claim 8, wherein transforming the first field of user-entered text into the first image comprises at least one of:
an image-to-image transformation;
a text-to-image transformation; or
a font transformation.

12. A computer-implemented method comprising:
receiving, by a second computing device and from a first computing device, a document with two or more fields of user-entered text removed, a first image, a first tag associated with the first image, a second image, and a second tag associated with the second image, wherein:
the first tag indicates a first location of a first field of user-entered text in the document; and
the second tag indicates a second location of a second field of user-entered text in the document;
transforming, using a neural network, the first image into the first field of user-entered text;
transforming, using the neural network, the second image into the second field of user-entered text
reconstructing, based on the first tag and based on the second tag, a complete document by combining the first field of user-entered text, the second field of user-entered text, and the received document with the two or more fields of user-entered text removed;
comparing the first field of user-entered text to previously registered user data to determine whether the first field of user-entered text and the previously registered user data match; and
verifying, based on a determination that the first field of user-entered text matches the previously registered user data, the complete document.

13. The computer-implemented method of claim 12, wherein the first image comprises an encrypted image.

14. The computer-implemented method of claim 13, comprising:
decrypting the encrypted image prior to transforming the first image into the first field of user-entered text.

15. The computer-implemented method of claim 12, wherein transforming the first image into the first field of user-entered text comprises at least one of:
an image-to-image transformation;
an image-to-text transformation; or
a font transformation.

16. A second computing device comprising:
one or more processors; and
memory storing instructions that, when executed by the one or more processors, cause the second computing device to:
receive, from a first computing device, a document with two or more fields of user-entered text removed, a first image, a first tag associated with the first image, a second image, and a second tag associated with the second image, wherein:
the first tag indicates a first location of a first field of user-entered text in the document; and the second tag indicates a second location of a second field of user-entered text in the document;

transform, using a neural network, the first image into the first field of user-entered text;

transform, using the neural network, the second image into the second field of user-entered text reconstruct, based on the first tag and based on the second tag, a complete document by combining the first field of user-entered text, the second field of user-entered text, and the received document with the two or more fields of user-entered text removed;

compare the first field of user-entered text to previously registered user data to determine whether the first field of user-entered text and the previously registered user data match; and verify, based on a determination that the first field of user-entered text matches the previously registered user data, the complete document.

17. The second computing device of claim 16, wherein the first image comprises an encrypted image.

18. The second computing device of claim 17, wherein the instructions, when executed by the one or more processors, cause the second computing device to:

decrypt the encrypted image prior to transforming the first image into the first field of user-entered text.

19. The second computing device of claim 16, wherein transforming the first image into the first field of user-entered text comprises at least one of:

an image-to-image transformation;
an image-to-text transformation; or
a font transformation.

20. The computing device of claim 16, wherein the neural network comprises at least one of:

a generative adversarial network (GAN);
a consistent adversarial network (CAN);
a cyclic generative adversarial network (C-GAN);
a deep convolutional GAN (DC-GAN);
GAN interpolation (GAN-INT);
GAN-CLS; or
a cyclic-CAN (C-CAN).

* * * * *